Dec. 3, 1968 H. B. NELSON ET AL 3,414,149
TRAILER AND HOIST
Filed June 24, 1966 4 Sheets-Sheet 3

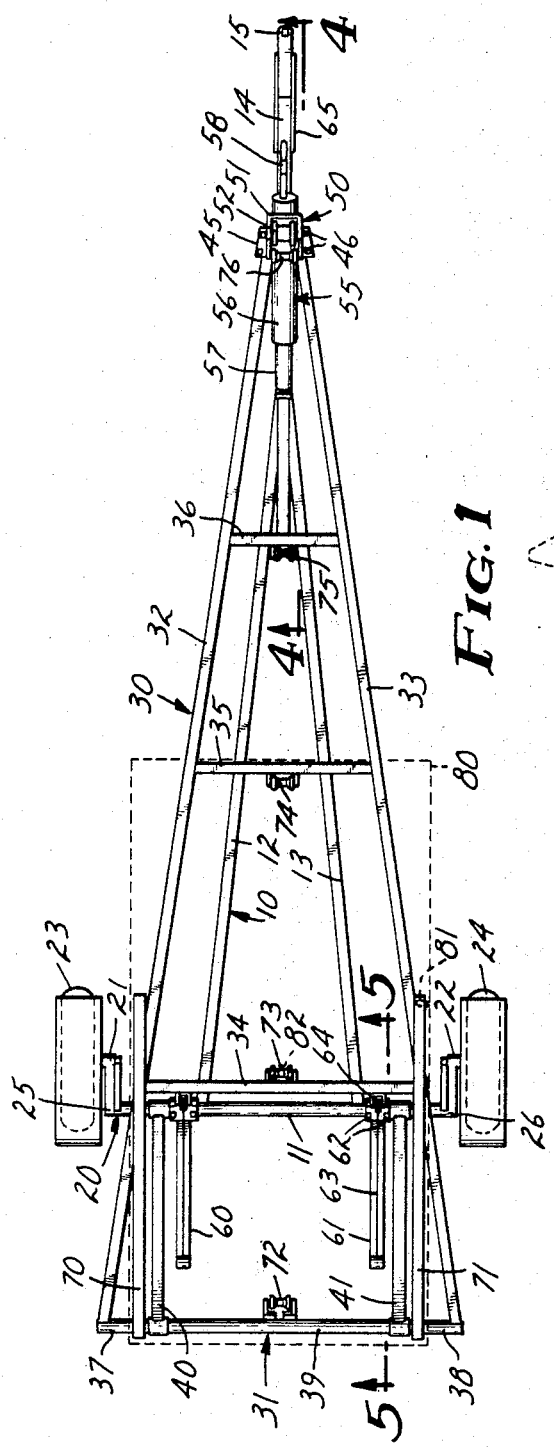
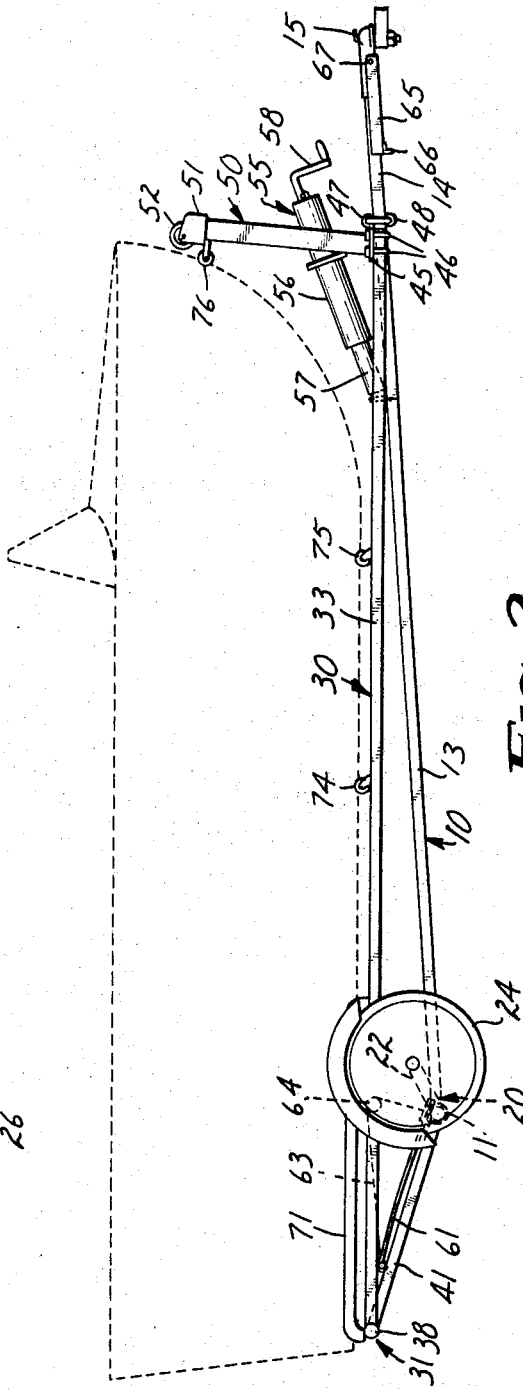
INVENTORS
HOWARD BOYD NELSON
HERBERT D. SCHILDT
BY Merchant & Gould
ATTORNEYS

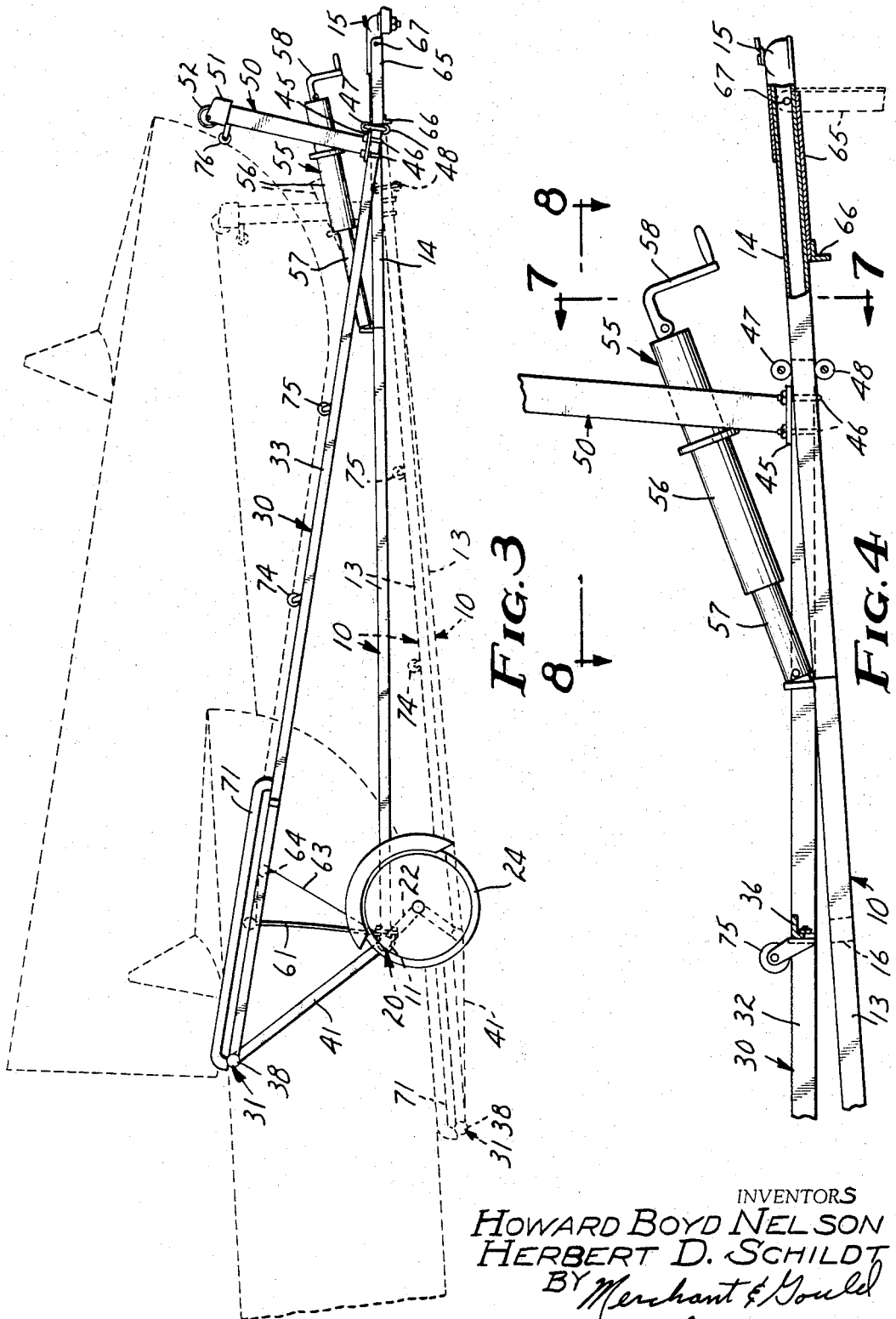

INVENTORS
HOWARD BOYD NELSON
HERBERT D. SCHILDT
BY Merchant & Gould
ATTORNEYS

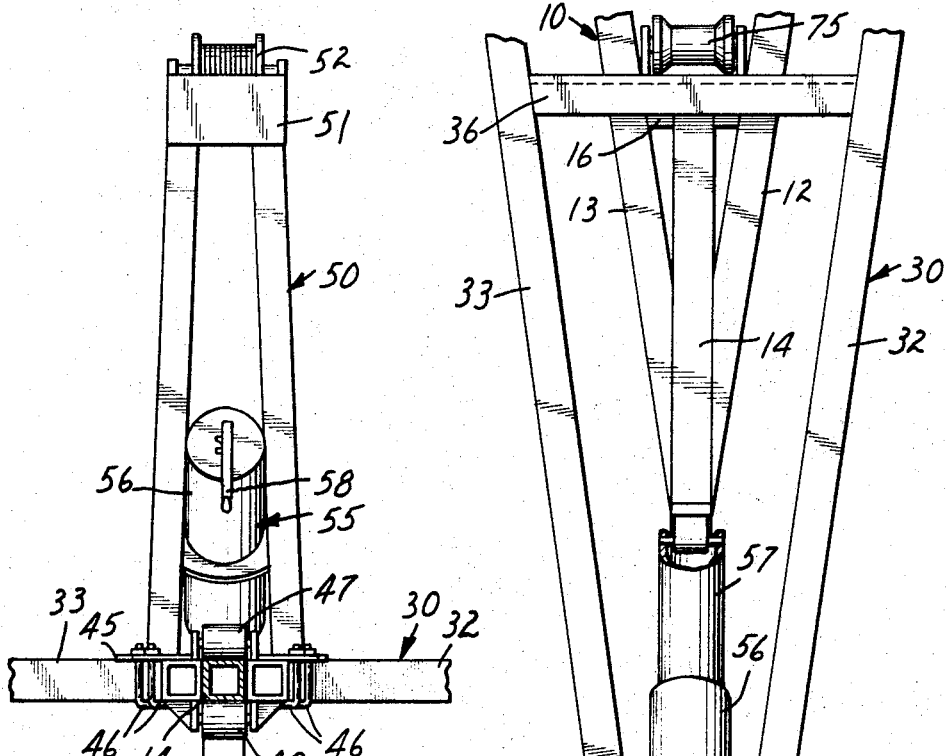
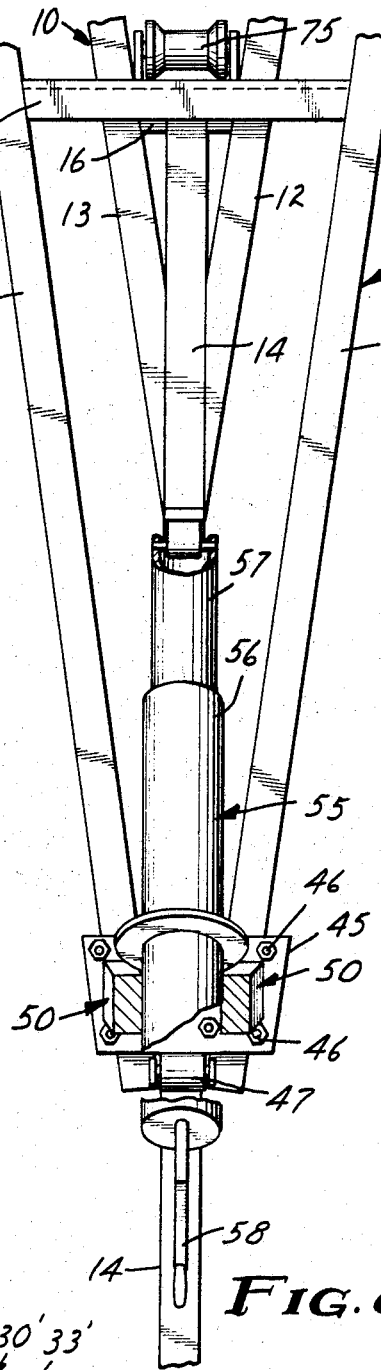
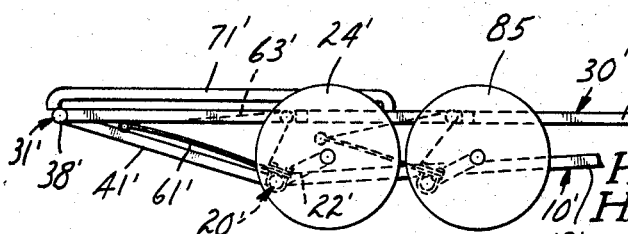
Fig. 7
Fig. 8
Fig. 9
INVENTORS
HOWARD BOYD NELSON
HERBERT D. SCHILDT
BY Merchant & Gould
ATTORNEYS

United States Patent Office 3,414,149
Patented Dec. 3, 1968

3,414,149
TRAILER AND HOIST
Howard Boyd Nelson, 1017 Broadway, and Herbert D. Schildt, Rte. 4, Box 88, both of Alexandria, Minn. 56308
Filed June 24, 1966, Ser. No. 560,223
8 Claims. (Cl. 214—506)

ABSTRACT OF THE DISCLOSURE

A trailer having a first frame with wheels pivotally mounted thereon and a second frame attached thereto in overlying relationship with the front ends slidably engaged for relative horizontal movement and the rear ends attached by pivotal links for relative vertical movements with relative horizontal movements of the front ends thereof. The wheels are further attached so that they pivot downwardly and raise the trailer vertically upwardly as the upper frame pivots upwardly.

---

Figure 5:
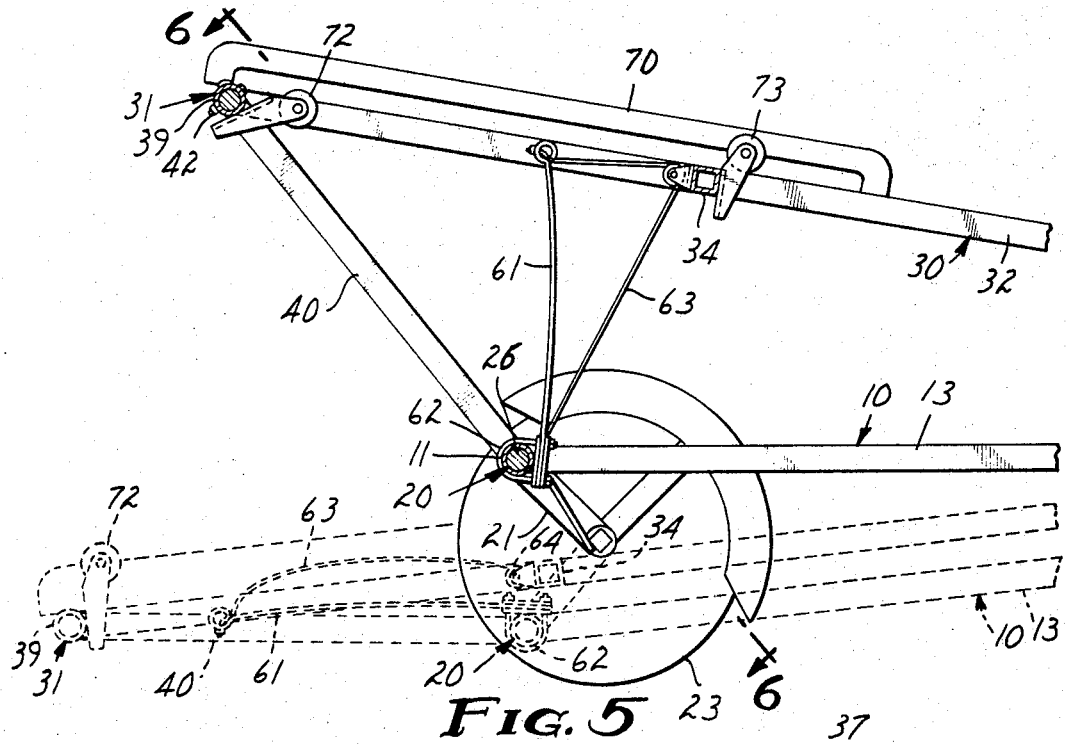

This invention pertains to a trailer for carrying vehicles and the like and more particularly to a trailer which raises and lowers to allow loading and unloading as well as temporarily hoisting objects.

In prior art trailers for carrying vehicles such as boats and the like, a vehicle receiving frame is fixedly attached to a pair of wheels and has a tongue or the like for attaching it to a draft apparatus. In most of these prior art trailers the vehicle to be transported must be manually lifted several feet off the ground and placed on the vehicle receiving frame. In some instances the labor involved in this operation is reduced slightly by tilting the entire frame, or some portion thereof, at an angle with the ground and sliding the vehicle thereon. In all of these devices the operator requires the assistance of at least one other person and, in the event that the vehicle is especially cumbersome, such as an extra large boat, more than one assistant may be required.

In some instances it is the custom to leave boats and the like in the water throughout the boating season. These boats are highly susceptible to high winds, etc. and must be loaded and removed from the water or hoisted slightly out of the water by special hoists. This requires a great deal of work and/or extra equipment. The present device operates as a trailer or hoist and can be utilized to simply raise a boat or the like out of the water when a storm threatens after which the boat can be easily lowered back into the water and the present device removed.

In the present device a novel framework is provided which can be lowered to a position only a few inches above the ground. If the trailer is to be utilized as a boat carrier a roller on the rear thereof rotates upwardly to a boat receiving position as the frame is lowered. A simple windlass at the front of the trailer can then be attached to the boat and the boat is easily moved onto the trailer by a single operator. The trailer frame is then raised until the boat is in a horizontal position at which time the rear roller has rotated downwardly until the boat is correctly positioned on supports. If the device is to be utilized as a hoist it can be placed in the water and the boat is placed thereon. The boat is then raised until it is somewhat above the water level and the entire assembly remains in place until the storm subsides after which the boat is lowered and the device is removed.

If the trailer is to be utilized for vehicles which can move on land under their own power, such as skimobiles, racing cars, etc., the trailer frame is lowered to the lowest position at which point the vehicle can be driven onto a platform mounted thereon. In the case of skimobiles and the like the platform may be made rotatable so that the skimobile may be driven off on the same side as it was loaded. For extra heavy loads the trailer can be constructed with dual wheels and associated springs.

The present device incorporates novel spring mounting means which act as shock absorbers for the trailer frame and any vehicles thereon. The novel mounting means is constructed so that the trailer frame can be lowered to a position substantially flat on the ground and the springs will not extend above the trailer frame or interfere with the loading and unloading operations.

It is an object of the present invention to provide a new and improved trailer and hoist.

It is a further object of the present invention to provide a trailer which is vertically movable to aid in the loading and unloading thereof as well as to provide hoisting movements.

It is a further object of the present invention to provide a trailer having a novel spring mounting means which does not interfere with the vertical movements of the trailer or the loading and unloading thereof.

It is a further object of the present invention to provide a trailer which can be utilized to carry a great variety of vehicles, such as boats, skimobiles, cars, etc.

These and other objects of this invention will become apparent to those skilled in the art upon consideration of the accompanying specification, claims, and drawings.

Figure 6:
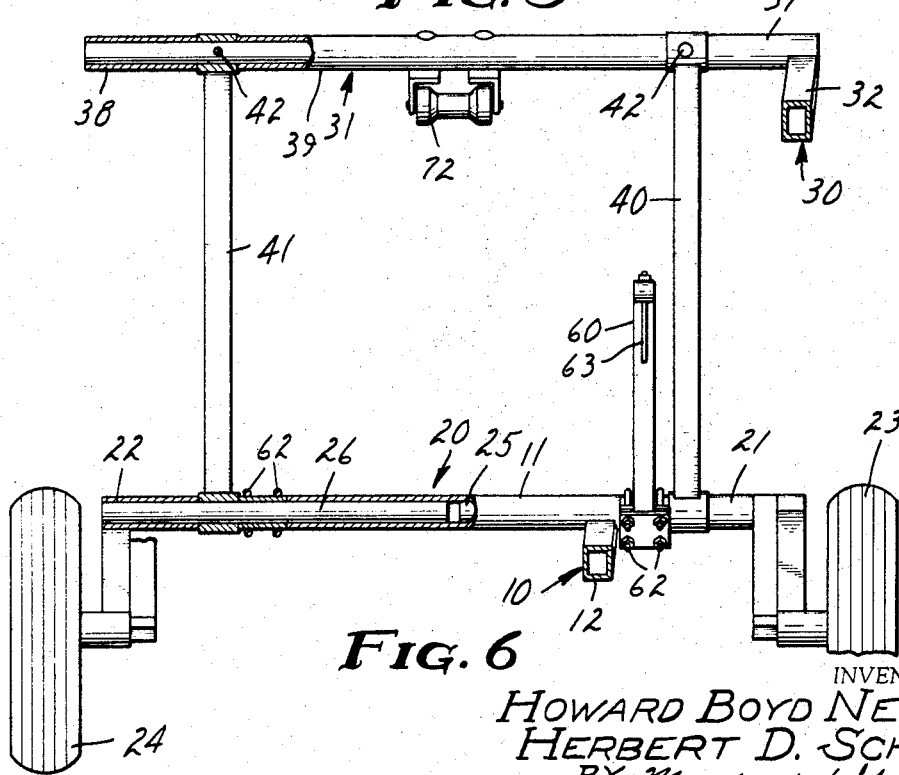

Referring to the drawings, wherein like characters indicate like parts throughout the figures:

FIG. 1 is a view in top-plan of the present trailer;
FIG. 2 is a view in side elevation of the present trailer;
FIG. 3 is a view in side elevation illustrating the frame in a raised and a lowered position and the relative positions of the various parts;
FIG. 4 is an enlarged sectional view as seen from the line 4—4 in FIG. 1, some parts removed and some parts shown in section;
FIG. 5 is an enlarged sectional view as seen from the line 5—5 in FIG. 1, illustrated the frame in a raised position;
FIG. 6 is a sectional view as seen from the line 6—6 in FIG. 5, some parts broken away and shown in section;
FIG. 7 is a slightly enlarged sectional view as seen from the line 7—7 in FIG. 4;
FIG. 8 is a slightly enlarged sectional view as seen from the line 8—8 in FIG. 4; and
FIG. 9 is a view similar to FIG. 2 illustrating a different embodiment of the present trailer, parts thereof removed.

In the figures the numeral 10 indicators a first generally triangularly shaped frame member. The base of the first frame member 10 consists of a hollow cylinder 11 which extends transversely to the longitudinal axis of the trailer. The frame member 10 has a pair of sides 12 and 13 which extend from the cylinder 11 toward the front end of the trailer. The sides 12 and 13 converge to a point at which the year fixedly attached to an elongated member 14 which extends along the longitudinal axis of the trailer and serves as the tongue thereof. The extreme forward end of the member 14 has a hitch 15 fixedly attached thereto for attaching the trailer to a draft means, such as an automobile or the like. The elongated member 14 extends rearwardly from the apex of the sides 12 and 13 a short distance to a cross-brace 16, which is fixedly attached at either end to the sides 12 and 13. In the present embodiment the sides 12 and 13, the elongated member 14, the cross-brace 16 and most of the parts to be disclosed presently are constructed of material having a substantially square cross-section the sides of which are approximately two inches long. This material is utilized to give the trailer extra strength, however, it should be understood that any desirable material, such as angle iron, channel iron, etc.

might be utilized and would still come within the scope of this invention.

Axle means generally designated 20 consists of a split axle having a left and right part designated 21 and 22 respectively. Each of the parts 21 and 22 of the axle means 20 is substantially similar and is shaped somewhat like a crank with a wheel 23 and 24, respectively, attached at the outer horizontally disposed ends thereof and central portions 25 and 26 eccentric with the axis of the wheels 23 and 24. The central portions 25 and 26 of the parts 21 and 22 of the axle means 20 are rotatably mounted in opposite sides of the cylinder 11 of the first frame member 10. The eccentric portions 25 and 26 of the axle parts 21 and 22 extend outwardly from the ends of the cylinder 11 a substantial distance for reasons which will be apparent presently.

A second frame member designated 30 is generally triangularly shaped with a base 31 and sides 32 and 33 converging toward the front of the trailer and substantially parallel to the sides 12 and 13 of the frame member 10. The second frame member 30 is larger than the frame member 10 and positioned thereabove. Three braces 34, 35 and 36 extend between the sides 32 and 33 of the frame member 30 in a generally transverse direction to the longitudinal axis of the trailer and are spaced apart between the base 31 and the apex of the frame member 30. The base 31 of the frame member 30 consists of a pair of cylindrical members 37 and 38, which are fixedly attached to the ends of the sides 32 and 33 and extend inwardly generally transverse to the longitudinal axis of the trailer, and a shaft 39 rotatably mounted therein. In the present embodiment the shaft 39 includes a central portion having an outer diameter substantially equal to the outer diameter of the cylindrical members 37 and 38 and a pair of stub shafts having a somewhat reduced outer diameter extending outwardly from either end thereof into the cylindrical members 37 and 38. The shaft 39 is constructed in this fashion to decrease the weight of the overall trailer and to standardize the sizes of the various components, however, it should be understood that the shaft 39 can be a solid shaft the length of the base 31 if extra strength is desired.

A pair of linking members 40 and 41 each have a hollow cylindrical shaped portion at either end thereof with the axes extending transverse to the longitudinal axis of the linking members 40 and 41. The cylindrical portion at one end of the linking member 40 is coaxially positioned over the eccentric portion 25 of the axle part 21 of pivotally attach the linking member 40 thereto. The cylindrical member at the other end of the linking member 40 is coaxially positioned over the shaft 39 in the base 31 of the frame member 30 and fixedly attached thereto by a pin 42 (see FIG. 6). In a like fashion one end of the linking member 41 is pivotally attached to the eccentric portion 26 of the axle part 22 while the other end is fixedly attached to the shaft 39. By pivoting the linking members 40 and 41 about the eccentric portions 25 and 26 of the axle parts 21 and 22 and by pivoting the shaft 39 within the cylindrical members 37 and 38 the frame member 30 can be raised and lowered vertically with respect to the frame member 10. Increasing or decreasing the length of the linking members 40 and 41 increases or decreases the distance to which the two frame members 10 and 30 can be separated. However, this distance is limited by the amount of allowable relative horizontal movement between the front ends of the frame members 10 and 30 and the overall dimensions thereof.

The sides 32 and 33 of the second frame member 30 extend a substantial distance past the apex of the frame member 10 and terminate before they converge so that the ends are spaced apart a distance slightly greater than the width of the elongated member 14. A flat plate 45 is fixedly attached across the upper surfaces of the two plates by a plurality of U-bolts 46. A pair of rollers 47 and 48 are rotatably mounted between the sides 32 and 33 so as to engage the upper and lower surfaces, respectively, of the elongated member 14. Thus, the apex of the frame member 30 engages the elongated member 14 for relative horizontal movement therealong. The lengths of the various components are such that movement of the front end of the frame member 30 relative to the front end of the frame member 10 causes the linking members 40 and 41 to pivot about the ends thereof and produce relative vertical movement between the rear ends of the frame members 10 and 30.

A post generally designated 50 consists of a pair of spaced apart elongated members having their lower ends fixedly attached to the plate 45 and their upper ends fixedly attached together by a plate 51. The post 50 extends upwardly from the plate 45 and in a somewhat forward direction so as to make an angle somewhat greater than 90° with the frame members 30. A hand operated windlass 52 is provided at the upper end of the post 50 in a conventional manner so that vehicles such as boats or the like may be drawn onto the frame member 30.

A force producing means, which in this embodiment is a mechanical screw jack generally designated 55, is mounted with the housing 56 fixedly attached between the members of the post 50 and the moving member 57 having its free end pivotally attached to the frame member 10. A hand crank 58 extends outwardly from the housing 56 towards the front of the trailer and provides a means for activating the screw jack 55. As the hand crank 58 is rotated the members 57 is forced out of the housing 56 or is drawn into the housing 56. The relative movement between the moving member 57 and the housing 56 causes a relative movement between the frame members 10 and 30 thereby producing the relative vertical movement at the rear end of the trailer. While a simple mechanical screw jack is illustrated in the present embodiment, it should be understood that the force producing means might be a hydraulic jack, a battery operated motor and gear arrangement, or any other device for producing relative horizontal movements between the front ends of the frame members 10 and 30.

In the drawings a pair of leaf springs 60 and 61 each have one end fixedly attached to the central portions 25 and 26 of axle parts 21 and 22, respectively. The leaf springs 60 and 61 radiate outwardly to the rear and somewhat upward from the central portions 25 and 26 when the offset portion of the axle parts 21 and 22 is substantially horizontal and extending rearwardly from the axis of the wheels 23 and 24. Since both of the leaf springs 60 and 61 are attached to the trailer in a similar fashion only the leaf spring 61 will be described in detail. The details of the connection of leaf spring 61 are illustrated in FIG. 5.

The lower end of the leaf spring 61 is attached to the axle part 22 by U-bolts 62 so that leaf spring 61 rotates with the axle part 22. The free end of the leaf spring 61 has flexible means, which in this embodiment is a cable 63, fixedly attached thereto. The leaf spring 61 extends outwardly from the axle part 22 a sufficient distance so that the free end thereof lies substantially in the plane of the frame member 30. A small pulley type roller 64 is rotatably attached to the frame member 30 for rotation about an axis transverse to the longitudinal axis of the frame member 30. The pulley 64 is spaced from the free end of the leaf spring 61 toward the front end of the frame member 30. The cable 63 extends from the free end of the leaf spring 61 through the pulley 64 and is fixedly attached to the leaf spring 61 adjacent the end thereof which is attached to the axle part 22.

The leaf springs 60 and 61 are connected between the axle parts 21 and 22 and the second frame member 30 so as to operate in the following manner. As the handle 58 of the screw jack 55 is rotated in a direction to raise the frame member 30 relative to the frame member 10 the pulley 64 on the frame member 30 moves so as to create a force on the cable 63 which causes the leaf spring 61 to rotate in a clockwise direction in FIG. 5, which rotation causes the axle part 22 to rotate. In a similar manner the leaf spring 60 is caused to rotate and in turn rotates the axle part 21. This rotation of the axle parts 21 and 22 raises the frame member 10 relative to the ground and the axis of the wheels 23 and 24. Thus, the frame member 10 is supported in its raised position by the leaf springs 60 and 61 and, since the remainder of the trailer is attached to the frame member 10, the entire trailer is spring mounted. As the crank 58 of the screw jack 55 is rotated in the other direction the rear portion of the frame member 30 lowers relative to the frame member 10 and the pulley 64 approaches the axle part 22 in FIG. 5, thereby removing tension from the leaf spring 61. In a like manner the pulley and axle part associated with the leaf spring 60 approach each other and both leaf springs 60 and 61 are allowed to rotate in a counterclockwise direction as the tension is removed therefrom. This counterclockwise rotation of the leaf springs 60 and 61 produces a similar rotation in the axle parts 21 and 22 which lowers the frame member 10 relative to the ground. As the frame member 30 is lowered the free ends of the leaf springs 60 and 61 remain in or below the plane of the frame member 30. Thus, when the trailer is in the lowered position, illustrated in dotted lines in FIGS. 3 and 5, the springs 60 and 61 have rotated downwardly so that they do not hamper loading or unloading operations.

Referring to FIG. 4 a stand 65 is constructed of a short piece of material having a U-shaped cross-section similar to a channel iron with an inner dimension between the ends of the arms slightly greater than the width of the elongated member 14. The stand 65 is pivotally mounted at the front end of the member 14 by pin 67 and pivots downwardly into a position approximately perpendicular thereto, to provide a means for maintaining the member 14 at a desired distance from the ground. When the stand 65 is pivoted upwardly it fits over a portion of the member 14 in a nesting or stored position. The free or rearmost end of the stand 65 has a piece of angle iron 66 fixedly attached thereto which provides a foot on which to rest the stand 65 so it does not sink into the ground. The angle iron 66 also serves as a stop for the rollers 47 and 48 to prevent the front end of the frame member 30 from traveling too far forward relative to the frame member 10.

A pair of boat receiving supports 70 and 71 are fixedly attached adjacent the rear end of the frame member 30. Each of the supports 70 and 71 consist of an elongated member which extends a few inches above the frame member 30 and has padding or the like thereon so as not to mar the outer surface of the boat or the like. A plurality of rollers 72–76 are fixedly attached at approximately the center of the axle 39, the braces 34–36 and the post 50. Utilizing the rollers 72–76 and the windlass 52 a boat or the like can easily be loaded onto the trailer when it is in the lowered position. It should be noted that the roller 72 which is attached to the axle 39 rotates with the axle 39, as illustrated in FIG. 5 and the relative length of the supports 70 and 71 and the mounting means for the roller 72 are such that the roller 72 extends above the supports 70 and 71 when the trailer is in the lowered position. As the trailer is moved into the raised position the roller 72 rotates in a clockwise direction into a lowered position so that the boat is lowered onto the supports 70 and 71. Thus, the boat is automatically lowered onto the supports 70 and 71 when the trailer is raised and automatically raised off of the supports 70 and 71 when the trailer is lowered to the loading position.

In FIG. 1 a rectangular shaped platform is drawn in dotted lines to illustrate a different possible embodiment of the present trailer. The rectangular shaped platform 80 is adapted to receive mobile type objects such as skimobiles, racing cars, motorcycles, etc. The platform 80 may be mounted on the trailer so as to be rotatably about an axis 82 approximately through the center thereof. Many of the mobile devices, such as skimobiles, etc., are not reversible and, therefore, are extremely difficult to remove from a trailer or the like. In the present embodiment the trailer may be lowered into the loading position and the skimobiles may be simply driven onto the platform 80. The platform may then be locked by some convenient means such as pin 81 and, when it is desired to unload the skimobile, the platform 80 may be rotated 180° about axis 82 and the skimobile may be simply driven off the same end of the trailer onto which it was driven.

A slightly different embodiment wherein the trailer is equipped with dual wheels so that much heavier loads may be placed thereon, is illustrated in FIG. 9. The parts in FIG. 9 which are similar to the parts in FIG. 2 are provided with similar numbers having a prime therein to indicate a different embodiment. It should be noted that the rear wheel 24' is connected to the frame member 10' exactly as the wheel 24 in FIG. 2. The front wheel 85 is connected in substantially the same manner as the rear wheel 24' except that it is spaced from the wheel 24' toward the front of the frame member 10'. There are many other variations that might be made in the present trailer, such as connecting different springs in place of the leaf spring 60 and 61. The different springs might be heavier, lighter, different number, or different shape. Also, a variety of specialized supports and platforms might be attached to the frame member 30 for carrying a variety of vehicles or other loads. Thus, the present trailer has a great many advantages over the prior art including the ability to lower it into a position substantially flat on the ground so that vehicles may be simply driven thereon and the ability to operate as a hoist to raise boats and the like out of the water. Additional advantages are the novel spring mounting means and the apparatus which automatically raises and lowers a boat or the like relative to the supports upon which it is received.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:
1. A trailer for carrying vehicles and the like comprising:
 (a) a first frame member;
 (b) a second frame member having the front end thereof attached to said first frame member adjacent the front end thereof for relative horizontal movement therebetween and adapted to receive a vehicle or the like thereon;
 (c) linking means pivotally mounted to said first and second frame members for relative pivotal movement therebetween;
 (d) force producing means attached between said first frame member and said second frame member in a manner to cause relative horizontal movement between the front ends thereof and relative vertical movement between the rear ends thereof;
 (e) an axle having wheels rotatably attached to both ends thereof and a central portion eccentric relative to the axis of said wheels; and
 (f) means attaching said axle to said first frame for relative pivotal movement of said wheels with relative vertical movement of said first and second frame members.

2. A trailer for carrying vehicles and the like substantially as set forth in claim 1 having in addition spring means affixed between the first and second frame members and the wheels for preventing sudden injurious movements of said members relative to the ground.

3. A trailer for carrying vehicles and the like substantially as set forth in claim 1 wherein the second frame has a vehicle receiving platform rotatably mounted thereon.

4. A trailer for carrying vehicles and the like substantially as set forth in claim 1 wherein the force producing means is a jack having the housing attached to one of said frame members and the movable portion attached to the other of said frame members so that activation of said jack produces relative movement between said members.

5. A trailer for carrying vehicles and the like substantially as set forth in claim 1 wherein the second frame member has at least two vehicle receiving supports thereon and a roller attached adjacent the rear end thereof for rotation with the linking means for lowering a vehicle onto said supports when said second frame member is raised relative to the first frame member and raising said vehicle off said supports when said second frame member is lowered relative to said first frame member.

6. A trailer for carrying vehicles and the like comprising:
 (a) a first frame member;
 (b) a pair of wheels rotatably attached at either end of axle means, said axle means having a central portion which is eccentric relative to the axis of said wheels;
 (c) means rotatably mounting said eccentric central portion of said axle means adjacent the rear end of said first frame member;
 (d) spring means fixedly attached to said axle means for rotation therewith;
 (e) a second frame member having the front end thereof attached to said first frame member adjacent the front end thereof for relative horizontal movement therebetween and adapted to receive a vehicle or the like thereon;
 (f) linking means having one end pivotally mounted to said first frame member adjacent the rear end thereof and the other end pivotally mounted to said second frame member adjacent the rear end thereof;
 (g) force producing means attached between said first frame member and said second frame member in a manner to cause relative horizontal movement between the front ends thereof and relative vertical movement between the rear ends thereof; and
 (h) means attaching said spring means to said second frame member for rotation of said axle means relative to said first frame member with vertical movement of said second frame member.

7. A trailer for carrying vehicles and the like substantially as set forth in claim 6 wherein the spring means and means attaching said spring means includes a leaf spring having one end fixedly attached to the axle means with the other end radiating outwardly therefrom and having flexible means attached thereto, said flexible means being movably engaged to the second frame member and fixedly attached adjacent said one end of said spring means.

8. A trailer for carrying vehicles and the like substantially as set forth in claim 6 having in addition a second pair of wheels and associated axle means and second spring means all attached to said first and second frame members in a manner similar to and in parallel with the first pair of wheels and associated axle means and the first spring means.

References Cited
UNITED STATES PATENTS

| | | | |
|---|---|---|---|
| 2,740,639 | 4/1956 | Eckroad | 280—43.11 |
| 2,835,400 | 5/1958 | Latzke | 280—43.11 X |
| 2,987,203 | 6/1961 | Funk | 214—506 |

ALBERT J. MAKAY, *Primary Examiner.*